Sept. 28, 1937.     P. SCHUBERT     2,094,474
SHOCK ABSORBING DEVICE
Filed April 1, 1937

Inventor:
Paul Schubert,
by Harry E. Dunham
His Attorney.

Patented Sept. 28, 1937

2,094,474

UNITED STATES PATENT OFFICE 2,094,474

SHOCK ABSORBING DEVICE

Paul Schubert, Berlin-Karlshorst, Germany, assignor to General Electric Company, a corporation of New York Application April 1, 1937, Serial No. 134,389
In Germany April 15, 1936

3 Claims. (Cl. 73—262)

My invention relates to shock absorbing devices and more particularly to a shock absorbing device for dry gas meters.

One object of my invention is to provide a resilient stop for the membrane driven mechanism in a dry gas meter.

For a better understanding of my invention together with other and further objects thereof, reference is had to the following specification when taken in connection with the accompanying drawing, and its scope will be pointed out in the appended claims.

Figure 1:
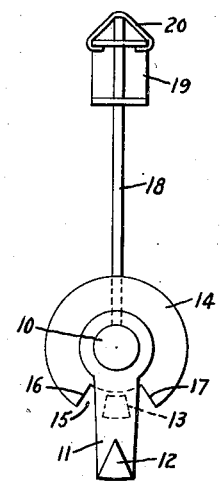
Figure 2:
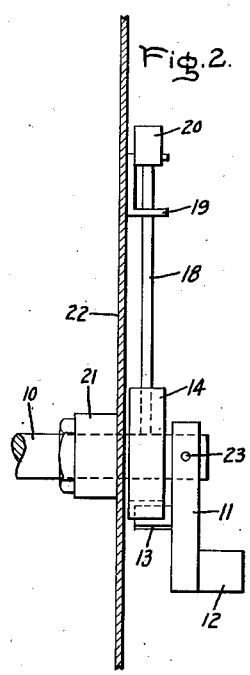

In the accompanying drawing, Fig. 1 is a front elevation of the shock absorbing device built in accordance with my invention; Fig. 2 is a side elevation thereof; and Fig. 3 is a sectional side elevation of a dry gas meter in which my shock absorbing device is applied.

Referring to the drawing in detail, Fig. 1 discloses a shaft 10 having mounted thereon a crank 11 provided with a forward projecting arm 12 and a rearwardly projecting arm 13. A collar 14 made of some material such as pressed paper or fiber, or other similar material, is loosely mounted on the shaft 10, and is provided with an open slot 15 having radial sides 16 and 17. The arm 13 projects into this slot 15 and engages the sides 16 and 17 at the end of its movement in either direction. In order to cushion the movement of this crank arm, the collar 14 is anchored by a resilient bar 18 which may be a spring wire, or other suitable material having a length substantially greater than the diameter of the collar 14. The bar 18 projects radially into the collar into a hole in which it is rigidly frictionally held, and is anchored slidably at its other end by a U-shaped bracket 19. A clamp 20 engages one arm of the bracket and the end of the bar 18 thereby preventing the bar 18 from moving outwardly in case it should become loose in the collar 14. Whenever the crank arm 11 is oscillated far enough for the arm 13 to engage and tend to move beyond the normal position of the side 16 or 17, the collar 14 tends to rotate about the shaft 10. In so doing, the resilient bar 18 being anchored at its outer end, is flexed, and thereby absorbs the energy of the oscillating shaft, moving this shaft back to its proper position as soon as it has absorbed this energy.

In Fig. 2, a side view of the mechanism above-described is shown. The shaft 10 projects through a stuffing box 21 in a wall 22 of a dry gas meter. The crank arm 11 with its horizontal arms 12 and 13, is pinned to the shaft by a pin 23. The collar 14 is held in place on the shaft 10 between the wall 22 and the crank arm 11.

Figure 3:
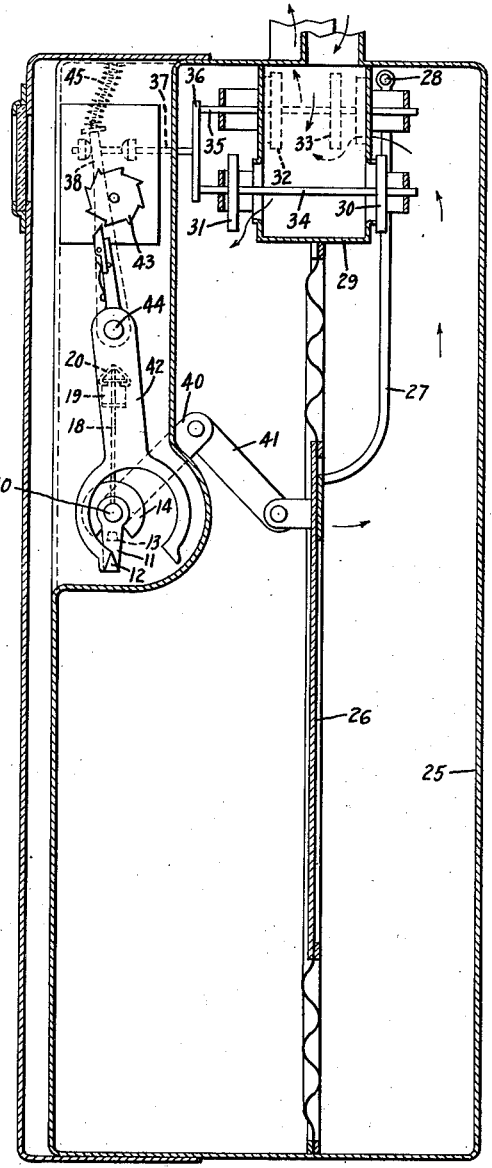

Fig. 3 is a side elevation, in section, of a dry gas meter comprising a casing 25 having mounted therein a membrane 26 suspended on an arm 27 pivoted at 28. Gas is alternately admitted to the casing 25 on opposite sides of the membrane 26 through a valve box 29 having therein valves 30, 31, 32, and 33. Valves 30 and 31 are mounted on a stem 34, and the valves 32 and 33 are mounted on a common stem 35. Stems 34 and 35 are connected by a cross bar 36, and are together operated by a rod 37 and an oscillating arm 38.

The membrane 26 is coupled by toggle links 40 and 41 to the shaft 10 and, through a crank arm 11 and a forked arm 42 operates a counter mechanism 43 and the valve operating arm 38. The forked member 42 is pivoted on a shaft 44, and is oscillated about this shaft by the horizontal arm 12 engaging the legs of the fork. An overcenter spring 45 aids in moving the arms 38 and 42 to their respective positions with a snap action, whereby the valves in the box 29 are set to admit and exhaust gas to the respective sides of the membrane. As a result of this valve setting the membrane is made to oscillate, and this oscillating movement is cushioned at its respective extremities by the shock absorbing mechanism applied to the shaft 10 and above-described.

What I claim as new and desire to secure by Letters Patent of the United States is:

1. A shock absorbing device for an oscillating shaft including a crank mounted to oscillate with said shaft, a collar provided with a peripheral slot loosely mounted on said shaft, a resilient bar projecting radially into said collar at one end and anchored at its other end, and a projection on said crank arm projecting into said slot and engaging the sides thereof respectively at each end of its travel.

2. In a shock absorbing device the combination of a shaft, a crank arm attached thereto, a collar provided with a peripheral slot loosely mounted on said shaft, a straight spring wire projecting radially into said collar and loosely anchored at its other end, said spring having a length considerably greater than the diameter of said collar, a projection on said crank engaging the sides of said slot near the ends of the oscillations of said shaft whereby said collar is slightly turned about the shaft so as to flex said wire spring and thereby absorb the kinetic energy in said shaft.

3. In a dry gas meter the combination of a shaft coupled to an oscillating membrane, a crank rotatable with said shaft, a collar loosely mounted on said shaft adjacent said crank and provided with a slot, a resilient bar projecting radially from said collar and frictionally mounted therein, said wire being of considerably greater length than the diameter of said collar and being anchored at its outer end, and an arm on said crank projecting into said slot and engaging the sides thereof in the vicinity of the end of the oscillations of said shaft whereby said collar is moved about said shaft so as to flex said resilient bar.

PAUL SCHUBERT.